(12) United States Patent
Cho et al.

(10) Patent No.: US 10,513,221 B2
(45) Date of Patent: Dec. 24, 2019

(54) SOFT UPPER TRIM FOR SWITCH ASSEMBLY OF VEHICLE DOOR AND METHOD OF MANUFACTURING THE SAME

(71) Applicants: SEOYON E-HWA CO., LTD., Seoul (KR); SEOYON AMERICA CORPORATION, Auburn Hills, MI (US)

(72) Inventors: Ji Hyun Cho, Cheonan-si (KR); Dong Suk Kim, Asan-si (KR)

(73) Assignees: SEOYON E-HWA CO., LTD., Seoul (KR); SEOYON AMERICA CORPORATION, Auburn Hills, MA (US)

( * ) Notice: Subject to any disclaimer, the term of this patent is extended or adjusted under 35 U.S.C. 154(b) by 0 days.

(21) Appl. No.: 16/185,634

(22) Filed: Nov. 9, 2018

(65) Prior Publication Data

US 2019/0275933 A1   Sep. 12, 2019

(30) Foreign Application Priority Data

Mar. 9, 2018   (KR) .................. 10-2018-0027756

(51) Int. Cl.
| | |
|---|---|
| *B60Q 3/217* | (2017.01) |
| *B60Q 3/64* | (2017.01) |
| *F21V 8/00* | (2006.01) |
| *H01H 9/16* | (2006.01) |
| *H01H 9/18* | (2006.01) |

(52) U.S. Cl.
CPC .............. *B60Q 3/217* (2017.02); *B60Q 3/64* (2017.02); *G02B 6/0055* (2013.01); *G02B 6/0065* (2013.01); *G02B 6/0088* (2013.01); *H01H 9/161* (2013.01); *H01H 9/182* (2013.01); *H01H 2219/028* (2013.01); *H01H 2219/056* (2013.01); *H01H 2219/062* (2013.01); *H01H 2229/044* (2013.01); *H01H 2229/056* (2013.01)

(58) Field of Classification Search
CPC .. B60Q 3/217; B60Q 3/62; B60Q 3/64; G02B 6/0088; H01H 9/161; H01H 9/182; H01H 2219/062
USPC ................................................ 200/313, 314
See application file for complete search history.

(56) References Cited

U.S. PATENT DOCUMENTS

| | | | | |
|---|---|---|---|---|
| 5,095,409 | A * | 3/1992 | Dematteo | H01H 9/161 116/286 |
| 5,252,798 | A * | 10/1993 | Kamada | H01H 9/182 200/310 |
| 2002/0101738 | A1* | 8/2002 | Misaras | B60K 37/06 362/487 |

(Continued)

FOREIGN PATENT DOCUMENTS

| | | |
|---|---|---|
| JP | 4218660 | 2/2009 |
| KR | 101087875 | 11/2011 |
| KR | 20170074740 | 6/2017 |

*Primary Examiner* — Alan B Cariaso
(74) *Attorney, Agent, or Firm* — Cantor Colburn LLP

(57) ABSTRACT

Provided is a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

2 Claims, 4 Drawing Sheets

(56) References Cited

U.S. PATENT DOCUMENTS

| | | | |
|---|---|---|---|
| 2005/0242607 A1* | 11/2005 | Neumann | B60R 13/02 |
| | | | 296/39.1 |
| 2007/0095643 A1* | 5/2007 | Weiss | H03K 17/962 |
| | | | 200/511 |
| 2008/0157605 A1* | 7/2008 | Bowden | B60K 37/06 |
| | | | 307/116 |
| 2019/0001880 A1* | 1/2019 | Schneider | B60Q 3/14 |
| 2019/0275934 A1* | 9/2019 | Cho | B60Q 3/54 |

* cited by examiner

SOFT UPPER TRIM FOR SWITCH ASSEMBLY OF VEHICLE DOOR AND METHOD OF MANUFACTURING THE SAME

BACKGROUND

1. Technical Field

The present invention relates to a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

2. Description of Related Art

A foamed skin trim 70 (see FIG. 1) at a door upper trim side for a vehicle is disclosed in the patent document (Korean Patent Registration No. 10-1087875).

A substrate for a door trim of a vehicle is divided into an injection-molded upper substrate, a center substrate, and a lower substrate. The three divided substrates are connected through screws or the like.

In addition, a foam-molded foam 50 and a transparent skin 60 are further laminated on the upper substrate 20 (see FIG. 1).

The foam 50 provides a cushioning sensation, and the transparent skin 60 provides a luxurious feeling, such as a leather feeling.

On the other hand, in the patent document (Japanese Patent Publication No. 4218660), as illustrated in FIGS. 2 and 3, when a driver puts a hand near a driving seat, operating symbols are displayed on a decorative panel 14, and the driver presses a desired operating symbol to operate.

That is, a switch device 10 configured to display a symbol is a hidden switch type which is embedded in a substrate of a door trim of a vehicle.

The hidden switch device 10 has a structure which is embedded only in a hard substrate. In particular, the hidden switch device 10 is embedded to be disposed between an upper portion and a lower portion of a lower trim.

Therefore, drivers who get out of the vehicle may not check a symbol inside the vehicle through a window.

In particular, after a door is locked or unlocked, when drivers get out of the vehicle, the drivers tend to check the symbol through the window, but such a demand may not be satisfied.

Above all, when the conventional switch device 10 is mounted on an upper trim, holes, into which the switch device 10 is inserted, should be formed in the transparent skin 60 and the foam 50, and after the switch is mounted, a finishing treatment should be performed with the transparent skin 60. However, the finishing treatment is postprocessed and thus may not attractive and likely to drop a price of the vehicle.

Due to the possibility of damage of the transparent skin 60, the conventional hidden switch device 10 has been embedded in a hard substrate as illustrated in FIGS. 2 and 3.

Meanwhile, in the patent document (Korean Patent Laid-Open Publication No. 10-2017-0074740), since a switch is provided on a substrate, the same problem arises similarly to the patent document (Japanese Patent Publication No. 4218660).

PRIOR-ART DOCUMENTS

Patent Documents (Patent Document 1) Korean Patent Registration No. 10-1087875
(Patent Document 2) Japanese Patent Publication No. 4218660
(Patent Document 3) Korean Patent Laid-Open Publication No. 10-2017-0074740

SUMMARY

1. Technical Problem

The present invention has been made to solve the above-mentioned problems, and a technical objective of the present invention is to provide a soft door trim for switch assembly of a vehicle, which is capable of displaying symbols on a transparent skin on an upper door trim thereof without damaging the transparent skin, and a method of manufacturing the same.

2. Solution to Problem

In order to achieve the above objects, according to an embodiment of the present invention, a method of manufacturing a soft upper trim for switch assembly of a vehicle door includes: (a) injection-molding an upper substrate such that a lower recessed groove in a lower side thereof and an upper recessed groove in an upper side thereof communicate with each other, wherein a switch module is inserted into the lower recessed groove and a light guide plate is inserted into the upper recessed groove; (b) assembling the light guide plate in the upper recessed groove, wherein the light guide plate has a thickness equal to a thickness of the upper recessed groove; (c) applying an adhesive on upper surfaces of the upper substrate and the light guide plate; (d) vacuum-pressing a transflective mesh foam on the upper surfaces of the upper substrate and the light guide plate in a vacuum mold, wherein the adhesive is applied on the upper surfaces of the upper substrate and the light guide plate; (e) printing a symbol on an upper surface of the transflective mesh foam; and (f) vacuum-pressing a transparent skin on the upper surface of the transflective mesh foam in an in-mold grain mold, wherein the transparent skin has a lower surface applied with an adhesive.

According to an embodiment of the present invention, a method of manufacturing a soft upper trim for switch assembly of a vehicle door includes: (a) injection-molding an upper substrate such that a lower recessed groove in a lower side thereof and an upper recessed groove in an upper side thereof communicate with each other, wherein a switch module is inserted into the lower recessed groove and a light guide plate is inserted into the upper recessed groove; (b) assembling the light guide plate in the upper recessed groove, wherein the light guide plate has a thickness equal to a thickness of the upper recessed groove; (c) vacuum-pressing a transflective mesh foam on upper surfaces of the upper substrate and the light guide plate in a vacuum mold, wherein the transflective mesh foam has a lower surface applied with an adhesive; (d) printing a symbol on an upper surface of the transflective mesh foam; and (e) vacuum-pressing a transparent skin on the upper surface of the transflective mesh foam in an in-mold grain mold, wherein the transparent skin has a lower surface applied with an adhesive.

According to an embodiment of the present invention, a soft upper trim for switch assembly of a vehicle door includes an upper substrate, a foam, and a transparent skin, which are laminated, wherein a through-hole, into which a switch module is inserted, is vertically formed in the upper substrate, a lower recessed groove, which has a diameter greater than a diameter of the through-hole, is formed in a lower side of the upper substrate, an upper recessed groove, which has a diameter greater than the diameter of the through-hole, is formed in an upper side of the upper substrate, a light guide plate, which has a thickness equal to a thickness of the upper recessed groove, is assembled in the upper recessed groove, the foam is a transflective mesh foam having an upper surface on which a symbol is formed, the transflective mesh foam is attached to upper surfaces of the upper substrate and the light guide plate, and the transparent skin is attached to an upper surface of the transflective mesh foam.

According to an embodiment of the present invention, the light guide plate includes side plates and an upper plate configured to connect upper surfaces of the side plates, wherein an accommodation groove, in which an upper side of the switch module is inserted and accommodated, is further formed inside a lower side of the light guide plate.

3. Advantageous Effects

The present invention has the following effects.

Since a transflective mesh foam and a transparent skin are laminated after a groove, in which a switch module is disposed, is formed in a lower surface of an upper substrate, continuity of a conventional transparent skin is maintained to secure both of a hidden property of the switch module and smoothness of the transparent skin, thereby providing an excellent external appearance.

In particular, since symbols are printed on an upper surface of an air-permeable and transflective mesh foam, light irradiated from a light guide plate only passes through the printed symbols to clearly implement the symbols.

In addition, since symbols are displayed on an upper substrate at a specific position close to a window, it is possible to check the symbols in the inside of a vehicle as well as through the window from the outside of the vehicle. In particular, it is possible to check whether a door is properly locked (when symbols are formed on a center substrate or a lower substrate, it is difficult or impossible for a driver to check the symbols inside or outside the vehicle).

A transparent skin and a transflective foam are separately molded, and when the transparent skin is vacuum-molded, the transflective foam is implemented as an air-permeable mesh foam so as to secure air-permeability of an upper substrate to which the foam is pressed and attached, and thus it is possible to prevent air from filling between the transparent skin and the mesh foam when in-mold grain (IMG) molding (vertical vacuum press molding) is performed.

Since an accommodation groove, in which an upper side of a switch module is accommodated, is formed in a center of a lower surface of a light guide plate, a thickness of an upper plate of the light guide plate is reduced by a thickness of the accommodation groove to considerably improve transmittance so that transmissivity can be highly improved and thus clearness of symbols can further be improved, and the accommodation groove can additionally function to fix the switch module.

(Description of Symbols)

Figure 1:
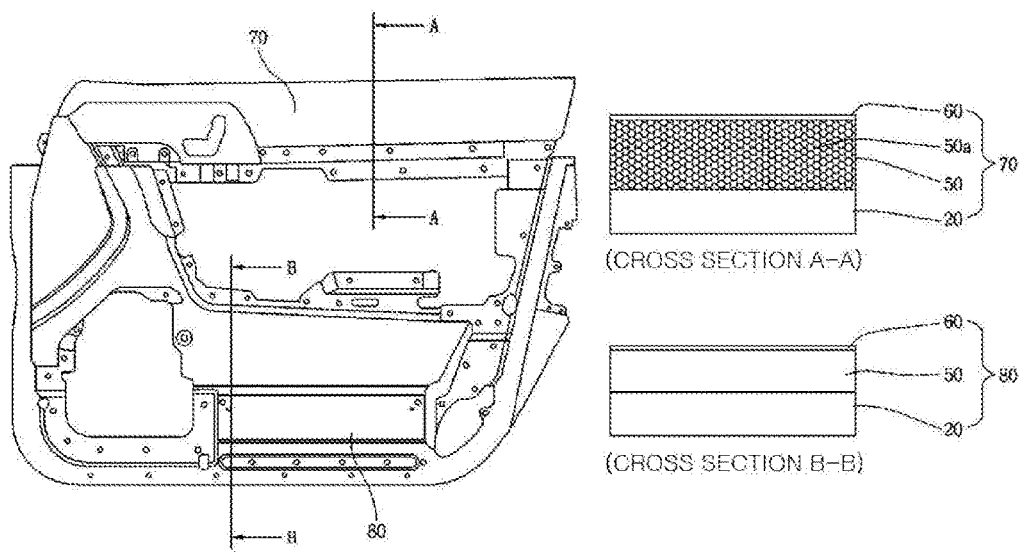
FIG. 1 illustrates a view of a conventional soft door trim for a vehicle and cross-sectional views of upper and lower trims thereof.
Figure 2:
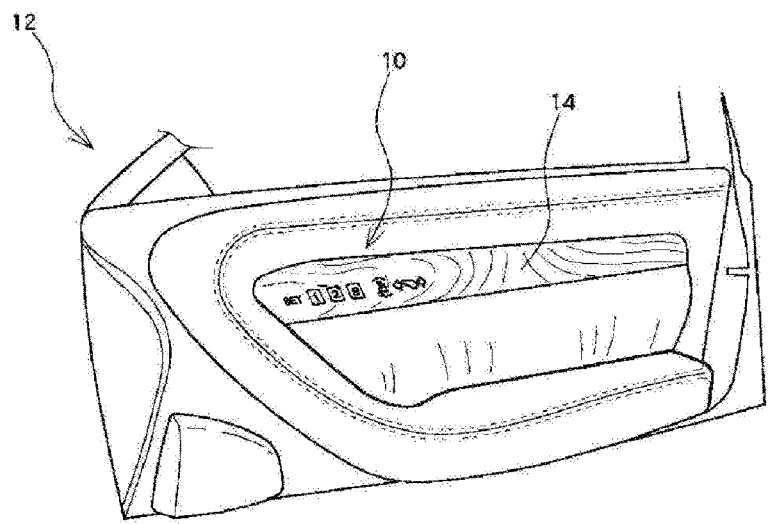
FIGS. 2 and 3 are diagrams illustrating an interior of a front seat door provided with a conventional switch device for a vehicle and illustrating states in which symbols of the switch device are displayed and not displayed.
Figure 3:
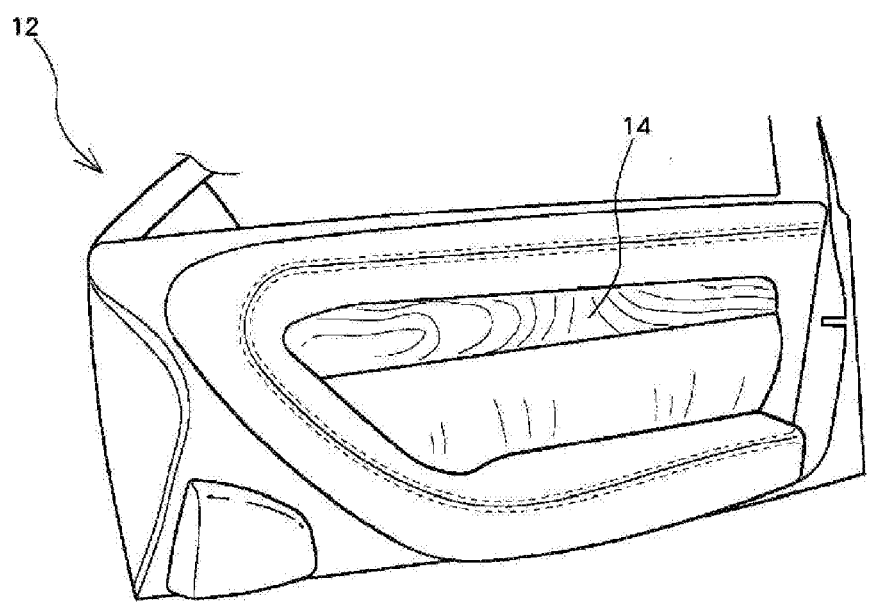

| | |
|---|---|
| 100: soft upper trim for switch assembly of a vehicle door | |
| 1: switch module | 3: switch |
| 5: bezel | 200: upper substrate |
| 210: through-hole | 230: lower recessed groove |
| 240: upper recessed groove | 300: light guide plate |
| 305: accommodation groove | 400: transflective mesh foam |
| 415: lock and unlock symbols | 500: transparent skin |
| 600: adhesive | |

DETAILED DESCRIPTION OF EMBODIMENTS

Hereinafter, exemplary embodiments of the present invention will be described in detail with reference to the accompanying drawings. The same reference numerals will be given to the same parts as conventional parts, and detailed description thereof will be omitted.

Figure 4:
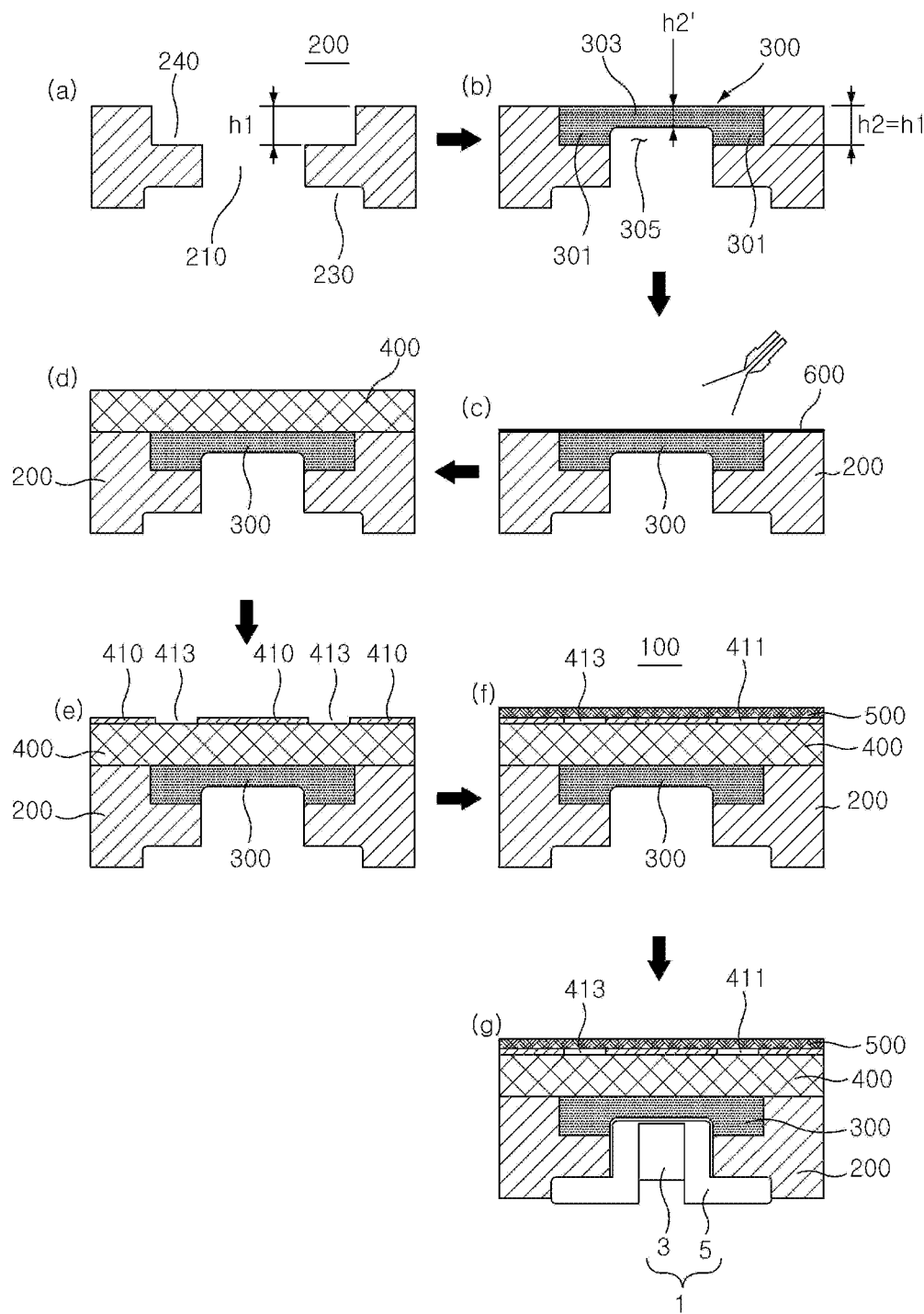
FIG. 4 is a set of sequence diagrams illustrating a method of manufacturing a soft upper trim for switch assembly for a vehicle door according to an exemplary embodiment of the present invention.
Figure 5:
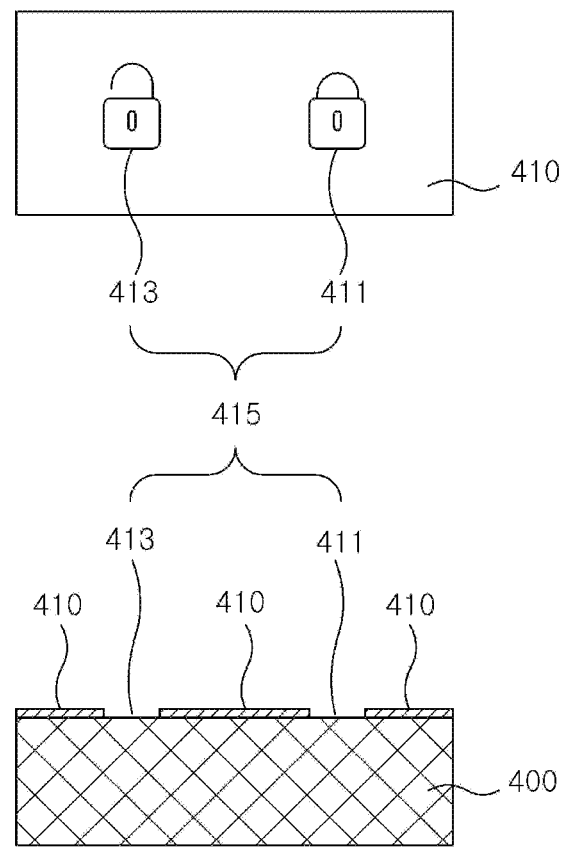
FIG. 5 is a diagram illustrating a state in which symbols are printed on a transflective mesh foam of FIG. 4.
Figure 6:
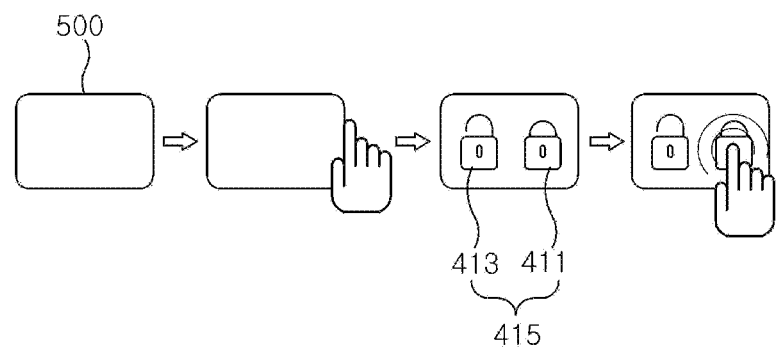
FIG. 6 is a set of operational sequence diagrams of a hidden switch.

FIG. 4 is a set of sequence diagrams illustrating a method of manufacturing a soft upper trim for switch assembly for a vehicle door according to an exemplary embodiment of the present invention. FIG. 5 is a diagram illustrating a state in which symbols are printed on a transflective mesh foam of FIG. 4. FIG. 6 is a set of operational sequence diagrams of a hidden switch.

As illustrated in FIG. 4F, a soft upper trim 100 for switch assembly of a vehicle door according to the present embodiment includes an upper substrate 200 on which a switch module 1 is assembled, a light guide plate 300 assembled to the upper substrate 200, a transflective mesh foam 400 attached to upper surfaces of the light guide plate 300 and the upper substrate 200, and a transparent skin 500 vacuum-pressed on an upper surface of the transflective mesh foam 400.

The upper substrate 200 is an injection-molded product made of polypropylene (PP).

As illustrated in FIG. 4A, a through-hole 210 is formed in the upper substrate 200 along a vertical center line thereof. A lower recessed groove 230 having a diameter greater than a diameter of the through-hole 210 is formed in a lower side of the upper substrate 200 so as to communicate with the through-hole 210.

The through-hole 210 and the lower recessed groove 230 become a space in which the switch module 1 is caught and assembled as illustrated in FIG. 4G.

An upper recessed groove 240 having a diameter greater than the diameter of the through-hole 210 is formed in an upper side of the upper substrate 200.

The light guide plate 300 is assembled in the upper recessed groove 240.

The light guide plate 300 is a material affiliated to engineering plastic such as polycarbonate (PC) and functions to uniformly diffuse light of light-emitting diode (LED (not shown)) of a switch device 3 in the switch module 1.

As illustrated in FIG. 4B, the light guide plate 300 includes side plates 301 and an upper plate 303 configured to connect upper surfaces of the side plates 301. An accommodation groove 305, in which an upper side of the switch module 1 is inserted and accommodated, is further formed inside a lower side of the light guide plate 300.

Therefore, since a thickness h2' of the upper plate 303 is less than a thickness h2 of the light guide plate 300 or the side plate 301, light may be more clearly diffused and pass through the upper plate 303.

In addition, since the upper side of the switch module 1 is accommodated and assembled in the accommodation groove 305, the additional fixing of the switch module 1 is much better.

Since the switch module 1 is inserted until a bezel 5 of the switch module 1 is caught on the lower recessed groove 230, the light guide plate 300 is not pressed upward excessively.

In addition, as illustrated in FIG. 4B, a thickness h1 of the upper recessed groove 240 may be equal to the thickness h2 of the light guide plate 300 or the side plate 301. That is, an upper surface of the upper substrate 200 may be at least the same as an upper surface of the light guide plate 300.

The foam 400 is the transflective mesh foam 400 having air-permeability. In particular, since a mesh is formed in a three-dimensional (3D) shape, the transflective mesh foam 400 may be embodied as a 3D mesh foam made of a fiber or PP material.

Furthermore, as illustrated in FIG. 4D, the transflective mesh foam 400 is vacuum-pressed on the upper surfaces of the upper substrate 200 and the light guide plate 300 in a vacuum mold.

Since a lower mold of the vacuum mold has air-permeability, as vacuum suction is performed downwardly, the foam 400 is vacuum-pressed on the upper surfaces of the upper substrate 200 and the light guide plate 300.

Here, as illustrated in FIG. 4C, after an adhesive is ejected and applied on the upper surfaces of the upper substrate 200 and the light guide plate 300, the transflective mesh foam 400 is placed and vacuum-pressed on the upper surfaces of the upper substrate 200 and the light guide plate 300. Alternatively, the transflective mesh foam 400 having a lower surface applied with an adhesive is placed and vacuum-pressed on the upper surfaces of the upper substrate 200 and the light guide plate 300.

The transflective mesh foam 400 may have a thickness of about 2 mm.

Since the transflective mesh foam 400 covers the entire upper surfaces of the upper substrate 200 and the light guide plate 300 as described above, even when the transparent skin 500 is vacuum-pressed in an in-mold grain (IMG) process, the transparent skin 500 is prevented from wrinkling or being uneven In addition, as illustrated in FIGS. 4E and 6, patterns corresponding to a lock symbol 411 and an unlock symbol 413 are printed (pad-printed or shaped-film-laminated) on the upper surface of the transflective mesh foam 400.

Reference numeral 410 denotes a shielding layer, which is provided to concentrate light on the symbols 411 and 413 such that the symbols 411 and 413 are more clearly viewed.

Therefore, when light passes thorough the light guide plate 300 and is emitted through the transflective mesh foam 400, only the lock and unlock symbols 411 and 413 pass through the transparent skin 500. Thus, a driver may view the lock and unlock symbols 411 and 413.

After the transflective mesh foam 400 is vacuum-pressed, as illustrated in FIG. 4F, the transparent skin 500 is vacuum-pressed on the upper surface of the foam 400.

The transparent skin 500 is vacuum-pressed in an IMG mold.

Since an upper mold of the IMG mold has an embossed portion engraved therein and has air-permeability, the embossed portion (leather pattern or the like) is naturally transferred onto a skin.

The transparent skin 500 is a non-textured sheet. The transparent skin 500 may be a semi-transparent polyvinyl chloride (PVC) or thermoplastic olefin (TPO) fabric which is preheated.

The transparent skin 500 may have a thickness of about 0.5 mm to 1.0 mm and a transmittance of about 10% to 15%.

The TPO fabric is a material which is widely used as an interior material of a vehicle.

The transflective mesh foam 400 having a thickness of 2.0 mm and the transparent skin 500 having a thickness of 0.5 mm have a transmittance of about 2% to 5%.

The switch module 1 includes a switch device 3 which includes lock and unlock-corresponding LEDs, a printed circuit board (PCB), and the like, and a bezel 5 on which the switch device 3 is mounted.

A method of manufacturing the above-described soft upper trim 100 for switch assembly of a vehicle door will be described with reference to FIG. 4.

As illustrated in FIG. 4A, an upper substrate 200 is injection-molded such that a lower recessed groove 230 and an upper recessed groove 240 communicate with each other, wherein a switch module 1 is inserted into the lower recessed groove 230 in a lower side of the upper substrate 200 and a light guide plate 300 is inserted into the upper recessed groove 240.

As illustrated in FIG. 4B, the light guide plate 300 having a thickness h2 equal to a thickness h1 of the upper recessed groove 240 (h1=h2) is inserted and assembled in the upper recessed groove 240 of the injection-molded upper substrate 200.

After the light guide plate 300 is assembled in the upper recessed groove 240, as illustrated in FIG. 4C, an adhesive 600 is applied on upper surfaces of the upper substrate 200 and the light guide plate 300.

As illustrated in FIG. 4D, an air-permeable and transflective mesh foam 400 is vacuum-suctioned downwardly in a vacuum mold and thus is vacuum-pressed on the upper surfaces of the upper substrate 200 and the light guide plate 300, on which the adhesive 600 is applied.

After the transflective mesh foam 400 is vacuum-pressed, as illustrated in FIG. 4E, symbols 415 are printed on an upper surface of the mesh foam 400.

After the symbols 415 are printed on the upper surface of the transflective mesh foam 400, as illustrated in FIG. 4F, a transparent skin 500 having a lower surface applied with an adhesive is placed and vacuum-suctioned and pressed in an IMG mold.

As illustrated in FIG. 4G, a switch module 1 is assembled to the soft upper trim 100 for switch assembly of a vehicle door as manufactured above.

The soft upper trim assembled with the switch module 1 is coupled to a center trim, and a lower trim and is assembled and used as a final interior material of a vehicle door.

Accordingly, as illustrated in FIG. 6, when a driver's hand approaches within 15 mm of the transparent skin 500 at a position where the hidden switch module 1 is assembled, a proximity sensor senses the hand, and light of the LED passes through the light guide plate 300 and the transflective mesh foam 400 to display only the lock and unlock symbols 415 on the transparent skin 500.

When a desired symbol is touched among the displayed lock/unlock symbols 415, light of an undesired symbol is turned off, and the desired symbol is turned off after a few seconds, operation of the switch module 1 is ended.

To turn off the symbols 415, a light irradiation time of the LED may be set.

On the other hand, instead of ejecting and applying the adhesive 600 of FIG. 4C on the upper surfaces of the upper substrate 200 and the light guide plate 300, the transflective mesh foam 400 having a lower surface pre-applied with an adhesive such as a hot-melt adhesive may be vacuum-pressed on the upper surfaces of the upper substrate 200 and the light guide plate 300.

In addition, although it has been described that the symbols 415 are lock/unlock patterns, the symbols 415 also include an operation symbol for performing functions inside a vehicle or an illumination symbol on which a lighting pattern for LED mood lighting is formed.

While the exemplary embodiments of the present invention are susceptible to various modifications and alternative forms, specific exemplary embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The invention claimed is:

1. A soft upper trim for switch assembly of a vehicle door, the soft upper trim in which an upper substrate, a foam, and a transparent skin are laminated, wherein:
   a through-hole, into which a switch module is inserted, is vertically formed in the upper substrate;
   a lower recessed groove, which has a diameter greater than a diameter of the through-hole, is formed in a lower side of the upper substrate;
   an upper recessed groove, which has a diameter greater than the diameter of the through-hole, is formed in an upper side of the upper substrate;
   a light guide plate, which has a thickness equal to a thickness of the upper recessed groove, is assembled in the upper recessed groove,
   the foam is a transflective mesh foam having an upper surface on which a symbol is formed;
   the transflective mesh foam is attached to upper surfaces of the upper substrate and the light guide plate; and
   the transparent skin is attached to an upper surface of the transflective mesh foam.

2. The soft upper trim according to claim 1, wherein the light guide plate includes side plates and an upper plate configured to connect upper surfaces of the side plates, wherein an accommodation groove, in which an upper side of the switch module is inserted and accommodated, is further formed inside a lower side of the light guide plate.

\* \* \* \* \*